Dec. 8, 1931.    J. C. WOODRUFF    1,835,921
HIGH PRESSURE JOINT
Filed June 23, 1928
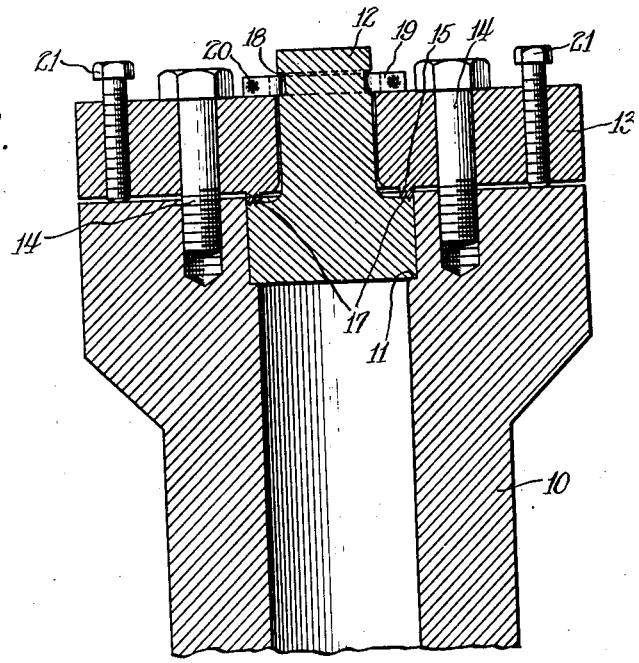
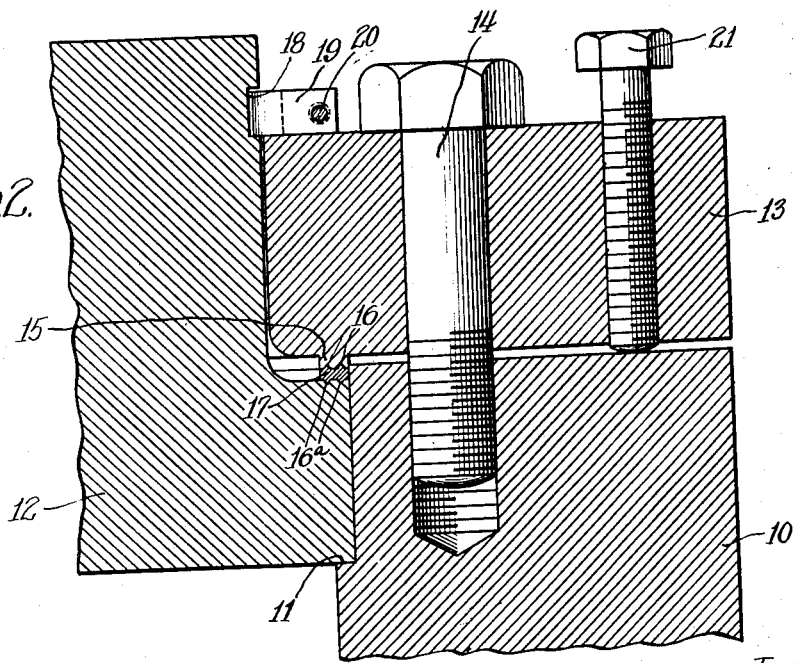
Inventor:-
John C. Woodruff
By Bonifant Hamilton atty Patented Dec. 8, 1931

1,835,921

UNITED STATES PATENT OFFICE

JOHN C. WOODRUFF, OF TERRE HAUTE, INDIANA, ASSIGNOR TO COMMERCIAL SOLVENTS CORPORATION, OF TERRE HAUTE, INDIANA, A CORPORATION OF MARYLAND

HIGH PRESSURE JOINT

Application filed June 23, 1928. Serial No. 287,674.

The present invention relates to joints, and more particularly to joints in connection with high pressure vessels such as those used in pressure processes for the synthesis of ammonia from nitrogen and hydrogen, and has for an object to provide an arrangement whereby an efficient joint is secured throughout substantially the entire life of the apparatus, and in which the internal pressure is utilized to tighten the joint and to make the same gas tight while permitting a quick and easy dismantling. Other more specific objects will appear from the description which follows hereafter.

The adaptation of the invention to the production of synthetic ammonia is described and illustrated merely by way of example and without defining the limits of the invention. In the drawings, Fig. 1 shows a diagrammatic fragmentary longitudinal section of an ammonia converter employing the present invention, it being understood that the portions of the parts of the apparatus which have been broken away are duplicates of those illustrated. Fig. 2 is a fragmentary sectional view on an enlarged scale of a portion of the converter in Fig. 1, showing the means of carrying out the present invention.

In the drawings, 10 represents a shell capable of resisting high internal pressures. This shell 10 is provided at opposite ends with the interior annular shoulders, 11, each of which is adapted to receive a head 12 to form a seat therefor. Each head 12 is retained in position by the retaining ring 13, the ring being apertured to receive screw 14 which passes thru the said ring and into appropriate recesses in the shell 10.

The ring 13 is further provided with an annular lug 15, adapted to retain a gasket in position. The lug 15 is provided with V-shaped annular notches 16, there being corresponding annular notches 16a in the shell. A gasket 17 is conveniently of copper or similar relatively soft material, held in position by the lug 15 and the shell. The head 12 is provided with an annular groove 18 in which is placed split ring 19, conveniently formed of steel, the sections of the ring being held together by means of the bolt 20, the groove 18 serving as a locking groove to hold the ring 19 in position. Passing through the ring 13 and near the outside periphery thereof are (conveniently) the screws 21 bearing against the top of the shell 10.

In practice, when the device is assembled, pressure is applied to the screws 14 to hold the retaining ring in place. This pressure exerted upon the screws 14 forces the ring 13 against the gasket 17, the gasket being securely held in place by the lug 15. Internal pressure generated within the shell 10 is effective against the head 12, and will tend to force the same outwardly, which tendency is resisted by the retaining ring 13. This pressure is exerted outwardly and opposite to the pressure acting upon the screws 14. The action of these forces will be exerted upon the gasket 17, so that the gasket will flow into the notches and will be forced out against the inner surface of the converter wall. Increase of internal pressure within the converter will thus tend to tighten the joint. When it is desired to remove the head, the screws 14 are loosened, and 21 tightened, the ring 13 being thereby raised. This lifting action is transmitted to the ring 19 and thence to the head 12, so that the ring 13, the ring 19, the gasket 17, and the head 12, will be removed together. It will be seen that the construction according to the present invention permits the ready dismantling of the apparatus and prevents the jamming of the head when the same is removed. If desired, the joint may be protected from dust and other foreign materials in any suitable manner as may become apparent to anyone skilled in the art. The invention is applicable to apparatus of any size, and the joint retains its effectiveness indefinitely and under fluctuating operating conditions. The gasket being confined substantially on all sides is prevented from becoming deformed in such a manner as to result in loss of efficiency.

It will be understood that it is desired to embrace within the scope of this invention such changes or modifications as may be necessary to adapt it to varying conditions and uses.

What is claimed is:

1. The combination with a shell in which high pressure is normally existent, a head fitting the inside of the shell, a flat ring evenly spaced from the shell top and adapted to retain the head in position, the said ring being provided with an annular lug, a face on the exterior of the head slightly below the top of the shell extending from and at right angles to the inner wall of the shell, a soft metal gasket between the said lug and a portion of the said face and substantially flush with the top of the shell, said parts operating to crowd the metal by compression from between the said lug and the said face and against the inner surface of the shell wall to form a fluid tight connection.

2. The combination with a shell in which high pressure is normally existent, a head fitting the inside of the shell and slightly movable outwardly under pressure, a flat retaining ring evenly spaced from the shell top and adapted to retain the head in position, a face on the exterior of the head slightly below the top of the shell, extending from and at right angles to the inner wall of the shell, a soft metal gasket between the said ring and a portion of the said face and substantially flush with the top of the shell, said parts operating to crowd the metal outwardly by compression from between the said lug and the said ring and against the inner surface of the shell wall to form a fluid tight connection.

In testimony whereof I affix my signature.

JOHN C. WOODRUFF.